United States Patent [19]

Bowers, Jr.

[11] 4,282,858

[45] Aug. 11, 1981

[54] SOLAR ENERGY SYSTEM AND METHOD

[75] Inventor: Richard S. Bowers, Jr., Lebanon, Pa.

[73] Assignee: Bowers Industries, Inc., Cleona, Pa.

[21] Appl. No.: 134,467

[22] Filed: Mar. 27, 1980

[51] Int. Cl.³ ............................................... F24J 3/02
[52] U.S. Cl. .................................... 126/425; 126/437;
126/439; 126/440
[58] Field of Search ............... 126/440, 441, 442, 417,
126/450, 424, 425, 430, 436, 439, 437, 400;
165/18

[56] References Cited

U.S. PATENT DOCUMENTS

| Re. 25,242 | 9/1962 | Toulmin | 126/439 |
|---|---|---|---|
| 294,117 | 2/1884 | Calver | 126/439 |
| 1,969,839 | 8/1934 | Goddard | 126/439 |
| 3,051,038 | 8/1962 | Duke | 126/439 |
| 3,869,119 | 3/1975 | Cummings | 126/440 |
| 3,985,118 | 10/1976 | Bard | 126/440 |
| 4,002,031 | 1/1977 | Bell | 126/440 |
| 4,026,267 | 5/1977 | Coleman | 126/449 |
| 4,037,652 | 7/1977 | Brugger | 126/437 |
| 4,068,474 | 1/1978 | Dimitroff | 126/440 |
| 4,201,197 | 6/1980 | Dismer | 126/440 |

Primary Examiner—Daniel J. O'Connor
Attorney, Agent, or Firm—L. Lawton Rogers, III

[57] ABSTRACT

A solar energy fluid heating system and method wherein sunlight is focused on the one end of a number of light pipes and directed by the other ends of the light pipes onto a heat conductive surface at the bottom of a number of tubes within a fluid storage tank. Each of the tubes within the tank is apertured adjacent to the lower end thereof and open at the other end thereof to permit fluid circulation within the tank. The tubes may be entirely of heat conducting material to accomplish fluid heating over an increased portion of the tubes.

8 Claims, 5 Drawing Figures

SOLAR ENERGY SYSTEM AND METHOD

BACKGROUND OF THE INVENTION

Solar energy heating systems are becoming increasingly popular due to the expense of fossil fuels, the maintenance of the systems for the combustion of fossil fuel, and the atmospheric pollution which results from such combustion. Such solar energy heating systems must generally be located in direct sunlight and generally include a lens system for focusing sunlight incident thereon into the fluid to be heated. This requires the location of fluid conduits and/or fluid tanks on the roofs of buildings, etc. creating additional expense in the fluid handling system and in the construction of the supporting structure.

Additionally, conventional solar heating systems are required for maximum efficiency to track the sun, and the increased weight of the fluid handling system represents a substantial increase in the size, weight and expense of the tracking mechanism as a result of the location of the fluid handling system in proximity to the sunlight collectors.

It is an object of the present invention to obviate many of the disadvantages associated with generally known solar heating systems and to provide a novel method and apparatus for heating a fluid by solar energy.

It is another object of the present invention to provide a novel method and heating system in which the fluid to be heated is remote from the solar collectors.

Is is a further object of the present invention to provide a novel method and solar heating system in which the fluid to be heated may be located out of the incidence of sunlight.

It is yet a further object of the present invention to provide a novel method and system for internal lighting.

These and many other objects and advantages of the present invention will be apparent from the claims and from the following detailed description of a preferred embodiment when read in conjunction with the appended drawings.

THE DRAWINGS

DESCRIPTION OF THE PREFERRED EMBODIMENT

Figure 1:
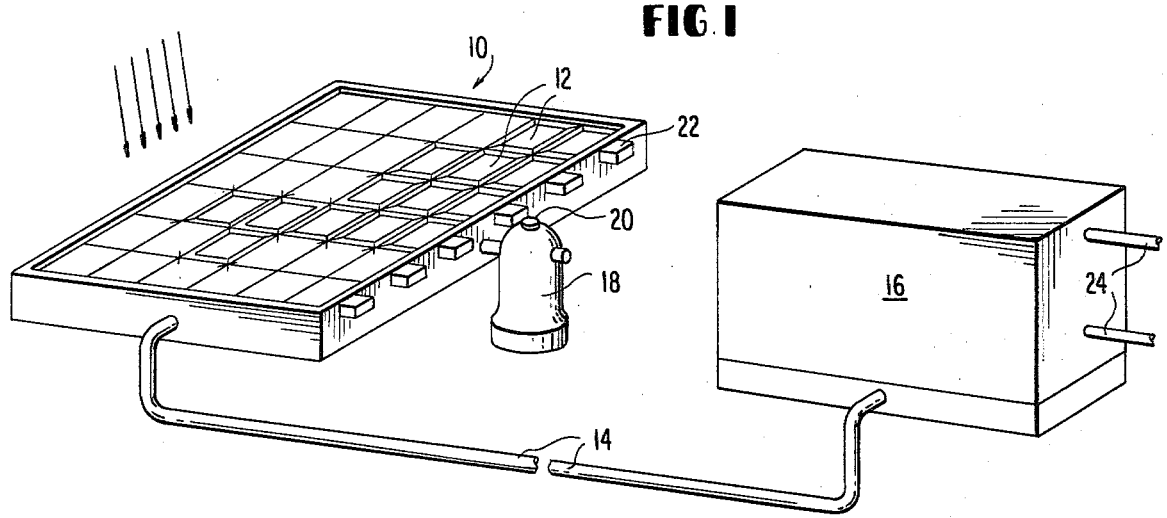
FIG. 1 is a pictorial representation of one embodiment of the present invention.

With reference now to the figures where like numerical designations have been accorded like elements in the interest of clarity, and with particular reference to FIG. 1, the invention comprises a solar energy collecting array 10, the individual solar collectors 12 of which are collected by means of fibre optic or a light pipe system 14 to a fluid storage tank 16.

The solar energy collecting array 10 will include a plurality of collectors 12 mounted in rows and columns. The entire array 10 may be positioned by suitable conventional electromechanical means (not shown) mounted by the supporting structure 18 and operative in a well known manner under the direction of one or more solar sensors 20 to track the sun. Alternatively, entire rows of the solar collectors 12 may be positioned as a unit under the control of suitable conventional sensing and tracking means 22. In all instances, maximum efficiency is obtained by the proper orientation of the individual collectors 12 with respect to the sunlight incident thereon.

The sunlight incident on each of the solar collectors 12 is focused on one end of a light pipe which may be of a suitable conventional type internally reflective of light conveyed therein. These light pipes or fiber optic elements may be flexible to accommodate movement of the solar collectors in tracking the sun and may be bundled together to convey collected sunlight to the fluid storage tank 16.

The fluid storage tank 16 is desirably of the type hereafter described in detail in connection with FIG. 3 and may include a plurality of heating elements each responsive to sunlight conveyed through the fiber optic system 14 to heat the fluid in contact therewith. The uses of the fluid heated in the tank may be conventional, and appropriate fluid influx and egress systems 24 may be provided.

Figure 2:
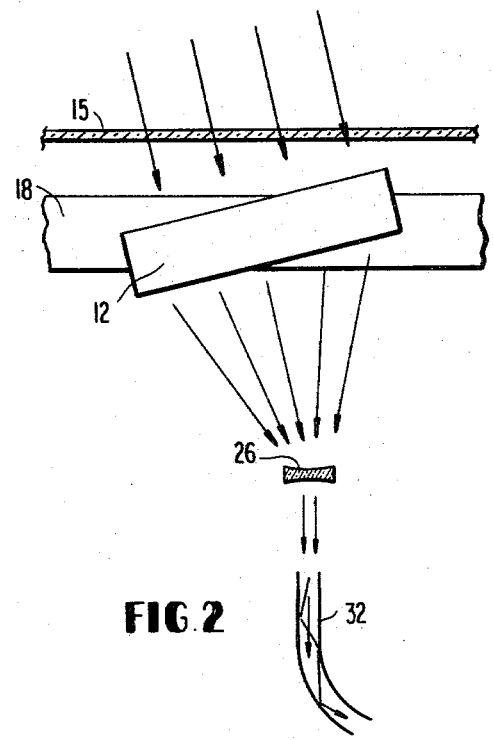
FIG. 2 is a schematic diagram illustrating the operation of a lens system useful in the present invention.

With reference to FIG. 2, the solar collector 12 may be positioned with respect to the sunlight by rotation beneath a glass cover 15 within the supporting frame 18. The lens 12 may be a square Fresnel lens serving to collect and focus the sunlight onto a bio-concave lens 26 which in turn directs the sunlight into a light pipe 32.

Figure 3:
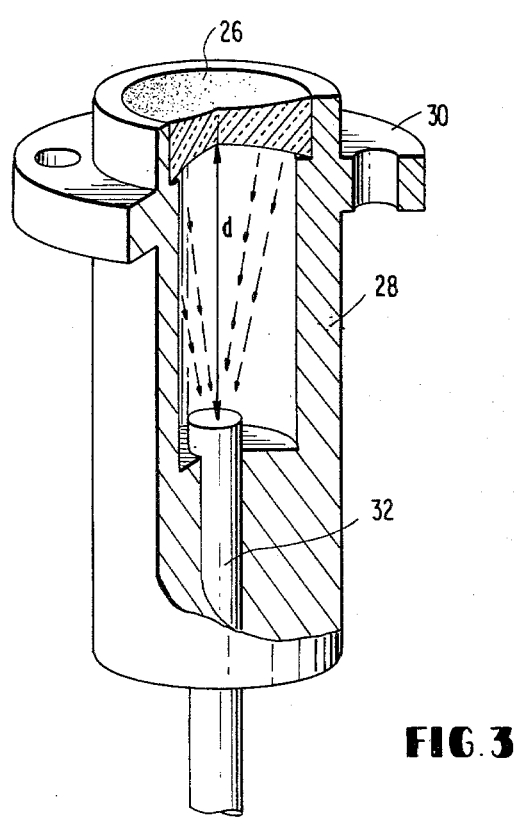
FIG. 3 is an elevation in partial section of one embodiment of the solar collector of the present invention.

With reference to FIG. 3, the embodiment of a solar collector is illustrated. As shown in FIG. 3, the collector may comprise a lens 26 mounted within a generally cylindrical housing 28 having a flange 30 apertured for mounting purposes. Axially located with respect to the lens 26 is one end of a light pipe 32 which may be adjusted by any suitable conventional means to conform the distance d between the end of the light pipe 32 and the surface of the lens 26 to the focal length of the lens.

The means for holding the light pipe 32 at the correct position may be any suitable conventional means and may be of the type hereafter described in more detail in connection with FIG. 5.

The lens unit is desirably positioned at the focal point at each of the solar collectors 12 of FIG. 1. By way of example, each of the solar collectors 12 may include a 12 inch square Fresnal lens having a focal length of approximately 7 inches. The purpose of the Fresnal lens is to magnify and to concentrate the solar energy onto the lens 26 which may be of the bio-concave type to direct the collected solar energy into the light pipe 32. Again by way of example, the collected element illustrated in FIG. 3 may be approximately 1 inch in diameter and approximately 2 inches in length.

The entire system of Fresnal lenses may be protected from the elements by a sheet of tempered glass or other solar energy transparent material. Maintenance is also simplified and a planar surface provided to facilitate cleaning.

Figure 4:
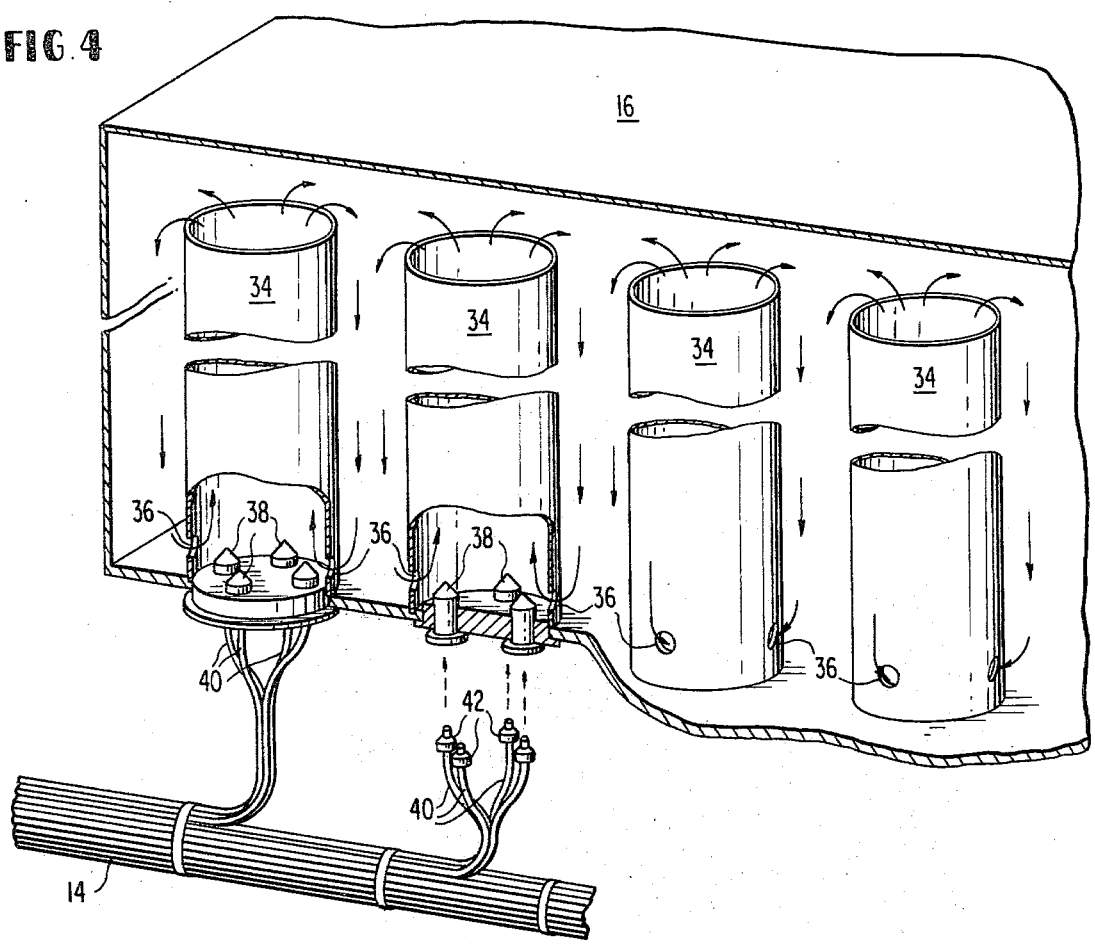
FIG. 4 is a pictorial representation in partial section of one embodiment of the fluid storage tank of the present invention.

With reference to FIG. 4, the fluid storage tank 16 of FIG. 1 may include any suitable conventional tank apertured at the bottom to receive rows and columns of heat transfer tube 34. As shown in FIG. 4, each of the heat transfer tubes 34 may be open at the upper end and provided with an aperture 36 at the lower end thereof. In this way, fluid heated within the tube may rise in the tube and circulate. The lower end of the tubes 34 is closed and is desirably formed into one or more pure metal shapes 38. The bottom of each of the tubes 34 is desirably of a heat conducting material whereby the direction of sunlight thereon will heat the material and thus the fluid in contact therewith. Copper has been found to be a suitable material. With continued reference to FIG. 4, the fiber optic system 14 of FIG. 1 may be separated into individual light pipes 40, each connected to one of the heat transfer tubes. Any suitable conventional connector 42 may be utilized to hold the individual light pipes 40 in position to direct sunlight existing therefrom against the lower surface of the heat conduction cones 38.

Figure 5:
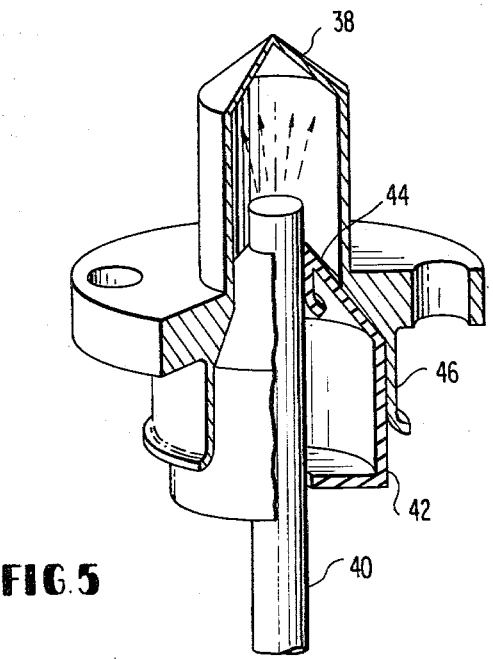
FIG. 5 is an elevation in partial section of one embodiment of the fluid heating elements illustrated in FIG. 4.

One embodiment of the light pipe connector 42 is illustrated in greater detail in FIG. 5 where, for simplicity's sake, only one of the metallic heating elements 38 is illustrated. As shown in FIG. 5, the means for adjusting the position of the light pipe 40 may comprise a metallic sleeve adapted to resiliantly grip the light pipe 40 and to be in turn gripped in any suitable conventional manner by the lower end 46 of the conical heating element 38.

It is desirable that the heating elements 38 be rigid in construction and adapted to be securely fastened to the tank inasmuch as the upper surface thereof may form the bottom of the fluid storage tank. While it is desirable that the rapid connect/disconnect light pipe 40 positioning means 44 be securely positioned with respect to the heating element 38, fluid tight integrity is not required.

LIGHTING SYSTEM

The system of the present invention has utility on an internal lighting system. In such a system, the light from the fiber optic system 14 of FIG. 1 may be used to illuminate with natural light internal spaces within a structure which is windowless or otherwise devoid of natural light. In systems of this type, an opaque lens may be used to defuse the light exiting the fiber optic system in a well known manner.

ADVANTAGES AND SCOPE OF INVENTION

From the foregoing, it is apparent that the method and solar energy heating system of the present invention is advantageous with respect to generally known solar heating systems. More particularly, the unique lens construction achieves great efficiency in the collection of solar energy and the utilization of a flexible fiber optic system to convey this energy to a remote location for fluid heating obviates the necessity for location of the fluid handling system adjacent the solar collectors. Significant savings may thus be obtained and the construction of the solar arrays supporting structure and in the cost of the fluid handling system.

In use as a lighting system, many of the same advantages are obtained and natural light may effeciently be conveyed to internal spaces.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A solar energy heating system comprising:
   a plurality of solar collectors each adapted for orientation toward the sun and each including a lens element for focusing sunlight;
   a fluid storage tank including a plurality of heat transfer tubes, at least the lower end of said tubes being of a heat conductor substance, being open at the upper end to permit the egress of relatively heated fluid therefrom, being closed at the lower end, and being apertured adjacent the lower end to permit the entrance of relatively cooled fluid into the tube adjacent the closed end; and
   fiber optic means for connecting each of said solar collectors to the closed end of one of said heat transfer tubes, said means including means at one end for positioning said one end to receive sunlight focused by one of said plurality of solar collectors and means at the other end for positioning said other end to direct sunlight against the closed end of one of said plurality of heat transfer tubes and thereby heat fluid within said storage tank.

2. The system of claim 1 wherein substantially all of each of said heat transfer tubes is heat conducting whereby heat generated by the direction of sunlight against the closed end of the tube is conducted away from the closed end thereof.

3. The system of claim 1 wherein said positioning means at the solar collector end of said fiber optic means includes means for varying the distance between the end of said fiber optic means and said lens element.

4. The system of claim 1 wherein said positioning means at the fluid storage tank end of said fiber optic means includes quick connect/disconnect means.

5. The system of claim 1 wherein said plurality of solar collectors are protected from the elements by a cover transparent to sunlight.

6. The system of claim 1 including means for orienting said plurality of solar collectors responsively to the position of the sun, said means including a sensor and an electromagnetic drive unit.

7. The system of claim 1 wherein each of said solar collectors includes a relatively large diameter Fresnel lens and a relatively small diameter bio-concave lens, the bio-concave lens being positioned at the approximate focal point of the Fresnel lens.

8. The system of claim 1 wherein substantially all of each of said heat transfer tubes is heat conducting whereby heat generated by the direction of sunlight against the closed end of the tube is conducted away from the closed end thereof;
   wherein said positioning means at the solar collector end of said fiber optic means includes means for varying the distance between the end of said fiber optic means and said lens element;
   wherein said positioning means at the fluid storage tank end of said fiber optic means includes quick connect/disconnect means;
   wherein said plurality of solar collectors are protected from the elements by a cover substantially transparent to sunlight;
   wherein said plurality of solar collectors including means for orienting said plurality of solar collectors responsively to the position of the sun, said means including a sensor and an electromagnetic drive unit; and
   wherein each of said solar collectors includes a relatively large diameter Fresnel lens and a relatively small ciameter bio-concave lens, the bio-concave lens being positioned at a point approaching the focal point of the Fresnel lens.

* * * * *